(12) United States Patent
Bower et al.

(10) Patent No.: US 11,945,597 B2
(45) Date of Patent: Apr. 2, 2024

(54) SYSTEMS AND METHODS FOR CONTROL ALLOCATION FOR ELECTRIC VERTICAL TAKE-OFF AND LANDING AIRCRAFT

(71) Applicant: Archer Aviation, Inc., Palo Alto, CA (US)

(72) Inventors: Geoffrey C. Bower, Sunnyvale, CA (US); Nansi Xue, Redondo Beach, CA (US); Alan Chen, San Carlos, CA (US); Benjamin Goldman, Santa Cruz, CA (US); Nathan Depenbusch, Mountain View, CA (US)

(73) Assignee: ARCHER AVIATION, INC., San Jose, CA (US)

( * ) Notice: Subject to any disclaimer, the term of this patent is extended or adjusted under 35 U.S.C. 154(b) by 535 days.

(21) Appl. No.: 17/157,580

(22) Filed: Jan. 25, 2021

(65) Prior Publication Data
US 2022/0234747 A1 Jul. 28, 2022

(51) Int. Cl.
*B64D 31/02* (2006.01)
*B60L 50/60* (2019.01)
(Continued)

(52) U.S. Cl.
CPC .............. *B64D 31/02* (2013.01); *B60L 50/60* (2019.02); *B60L 58/12* (2019.02); *B64C 27/57* (2013.01);
(Continued)

(58) Field of Classification Search
CPC ........ B64D 31/02; B64D 27/24; B64D 31/14; B60L 50/60; B60L 58/12; B60L 2200/10;
(Continued)

(56) References Cited

U.S. PATENT DOCUMENTS 3,059,876 A * 10/1962 Platt .................... B64C 29/0033
244/7 C
9,415,870 B1 8/2016 Beckman et al.
(Continued)

FOREIGN PATENT DOCUMENTS

CN 113002784 A 6/2021
CN 215475774 U 1/2022
(Continued)

OTHER PUBLICATIONS

International Search Report and Written Opinion dated Jun. 2, 2022, directed to International Application No. PCT/US2022/070303; 20 pages.
(Continued)

*Primary Examiner* — Muhammad Shafi
(74) *Attorney, Agent, or Firm* — Finnegan, Henderson, Farabow, Garrett & Dunner, LLP (57) ABSTRACT

A method of controlling an electric aircraft that has a plurality of actuators that includes a plurality of electric propulsion units includes: receiving force and moment commands for the electric aircraft; determining control commands for the plurality of actuators based on the desired force and moment commands by solving an optimization problem that comprises a noise minimization term for minimizing noise generated by the electric propulsion units; and controlling the plurality of actuators according to the determined control commands to meet the force and moment commands for the electric aircraft.

12 Claims, 8 Drawing Sheets

(51) Int. Cl.
 *B60L 58/12* (2019.01)
 *B64C 27/57* (2006.01)
 *B64C 27/59* (2006.01)
 *B64C 29/00* (2006.01)
 *B64D 27/24* (2006.01)
 *B64D 31/14* (2006.01)

(52) U.S. Cl.
 CPC .......... *B64C 27/59* (2013.01); *B64C 29/0033* (2013.01); *B64D 27/24* (2013.01); *B64D 31/14* (2013.01); *B60L 2200/10* (2013.01)

(58) Field of Classification Search
 CPC ..... B64C 27/57; B64C 27/59; B64C 29/0033; B64C 11/30; B64C 11/46; B64C 2220/00; Y02T 50/60
 USPC .............................................................. 701/3
 See application file for complete search history.

(56) References Cited

U.S. PATENT DOCUMENTS

| | | | |
|---|---|---|---|
| 10,562,620 | B2 | 2/2020 | Kroo et al. |
| 11,034,441 | B2 | 6/2021 | Mahboubi et al. |
| 11,155,356 | B2 | 10/2021 | Wheeler |
| 11,435,761 | B1 | 9/2022 | Wiegman |
| 11,495,982 | B2 | 11/2022 | Trela et al. |
| 11,524,767 | B2 | 12/2022 | Moy et al. |
| 2013/0099065 | A1 | 4/2013 | Stuhlberger |
| 2019/0100313 | A1* | 4/2019 | Campbell ................. B64D 1/02 |
| 2020/0023957 | A1* | 1/2020 | Kearney-Fischer .... B64C 39/02 |
| 2020/0031461 | A1* | 1/2020 | Mahboubi ............ G05D 1/0808 |
| 2020/0039638 | A1* | 2/2020 | Hunkel .................... B64C 19/00 |
| 2021/0206499 | A1 | 7/2021 | Balachandran et al. |
| 2021/0253234 | A1* | 8/2021 | Tao ...................... B64C 29/0025 |
| 2021/0339881 | A1 | 11/2021 | Bevirt et al. |
| 2021/0373579 | A1 | 12/2021 | Lukaczyk et al. |
| 2022/0127011 | A1 | 4/2022 | Long et al. |
| 2022/0250742 | A1 | 8/2022 | Bower |
| 2022/0289395 | A1 | 9/2022 | Matsumoto et al. |

FOREIGN PATENT DOCUMENTS

| | | |
|---|---|---|
| DE | 102020209359 A1 | 1/2022 |
| WO | 2019/232535 A1 | 12/2019 |
| WO | 2020/240567 A1 | 12/2020 |

OTHER PUBLICATIONS

Invitation to Pay Additional Fees dated Apr. 7, 2022, directed to International Application No. PCT/US2022/070303; 15 pages.
Invitation to Pay Additional Fees, and where applicable, Protest Fee, dated Apr. 7, 2022, directed to International Application No. PCT/US2022/070303; 15 pages.
Lovering. (Dec. 12, 2018). "Exploring Control Allocation for eVTOL Vehicles," located at https://acubed.airbus.com/blog/vahana/exploring-control-allocation-for-e-vtol-vehicles/. (4 pages).
Bower et al., U.S. Appl. No. 16/878,380, filed May 19, 2020 for "Vertical Take-Off and Landing Aircraft."

* cited by examiner

SYSTEMS AND METHODS FOR CONTROL ALLOCATION FOR ELECTRIC VERTICAL TAKE-OFF AND LANDING AIRCRAFT

FIELD

The present disclosure generally relates to aircraft control, and in particular, to control of electric vertical take-off and landing aircraft.

BACKGROUND

Vertical take-off and landing (VTOL) aircraft are aircraft that can take-off and land vertically and hover, providing the ability to carry travelers directly to their destination. Helicopters are VTOL aircraft that generate lift entirely through their rotors. Some VTOL aircraft have wings and propulsion systems that enable the wings to provide the lift required during forward flight. Some winged VTOL aircraft use separate propulsion systems for vertical thrust for use during take-off and landing and forward thrust for use during cruising. Other winged VTOL aircraft use tiltable propulsion systems that tilt between vertical thrust and forward thrust positions. Electric VTOL aircraft use electric propulsion units to provide thrust for vertical flight and forward flight. Many electric VTOL aircraft include moveable electric propulsion units in which the thrust vector of the propulsion unit can be changed, such as from an upward direction for vertical lift to a forward direction for forward flight. Many electric VTOL aircraft are over-actuated in that there are more actuator degrees of freedom than there are movement degrees of freedom. Control allocation is the problem of distributing control effort among multiple actuators in an over-actuated system. Electric VTOL aircraft often include more propulsion units and other actuators than traditional aircraft and the prolusion units and other actuators strongly affect multiple control axes. Thus, electric VTOL aircraft can pose a greater control allocation problem than traditional aircraft.

SUMMARY

According to some embodiments, systems and methods for control allocation in an electric VTOL aircraft include accounting for rotor acoustics in controlling the actuators of the aircraft. According to various embodiments, the control allocation includes solving an optimization objective function that includes meeting force and moment commands as a primary objective and modulating rotor acoustics as a secondary objective. In some embodiments, rotor acoustics are modulated by minimizing edgewise flight, varying the rotor speeds across the set of rotors, and/or minimizing propeller tip speed.

According to some embodiments, systems and methods for control allocation include accounting for battery pack charge in controlling actuators of the aircraft. In some embodiments, an electric VTOL aircraft includes a plurality of battery packs that are electrically isolated from one another and power one or more electric propulsion units. The control allocation can include solving an optimization objective function that includes meeting force and moment commands as a primary objective and balancing energy usage of the battery packs as a secondary objective. In some embodiments, electric propulsion units energized by battery packs with greater charge are preferentially utilized.

According to various embodiments, a method of controlling an electric aircraft that comprises a plurality of actuators that includes a plurality of electric propulsion units includes: receiving force and moment commands for the electric aircraft; determining control commands for the plurality of actuators based on the desired force and moment commands by solving an optimization problem that comprises a noise minimization term for minimizing noise generated by the electric propulsion units; and controlling the plurality of actuators according to the determined control commands to meet the force and moment commands for the electric aircraft.

In any of these embodiments, controlling the plurality of actuators according to the determined control commands may include operating at least a first electric propulsion unit of a plurality of electric propulsion units at a different speed than at least a second electric propulsion unit of the plurality of electric propulsion units to spread frequencies of the plurality of electric propulsion units across a wider frequency band.

In any of these embodiments, electric propulsion units closer to a fuselage of the aircraft may be operated at lower speeds than electric propulsion units further from the fuselage to reduce noise at the fuselage.

In any of these embodiments, electric propulsion units may be operated at different speeds during straight-ahead flight.

In any of these embodiments, at least a portion of the plurality of electric propulsion units may be tiltable, and controlling the plurality of actuators according to the determined control commands may include at least one of tilting the electric propulsion units and adjusting an attitude of the aircraft to minimize edgewise flight time.

In any of these embodiments, controlling the plurality of actuators according to the determined control commands may include setting a pitch of the blades of at least one electric propulsion unit to minimize a speed of the at least one electric propulsion unit.

In any of these embodiments, the electric aircraft may be a vertical take-off and landing aircraft.

In any of these embodiments, the electric aircraft may be manned.

In any of these embodiments, the electric aircraft may include multiple electric propulsion units on either side of a fuselage of the aircraft.

According to various embodiments, a system for controlling an electric aircraft that includes a plurality of actuators that includes a plurality of electric propulsion units, includes one or more processors, memory, and one or more programs stored in the memory for execution by the one or more processors for: receiving desired force and moment commands for the electric aircraft; determining control commands for the plurality of actuators based on the desired force and moment commands by solving an optimization problem that comprises a noise minimization term for minimizing noise generated by the electric propulsion units; and controlling the plurality of actuators according to the determined control commands to meet the desired force and moment commands of the electric aircraft.

According to various embodiments, a method of controlling an electric aircraft that includes a plurality of actuators that includes a plurality of electric propulsion units and a plurality of battery packs that power the plurality of electric propulsion units includes: receiving desired force and moment commands for the electric aircraft; monitoring energy states of the plurality of battery packs, wherein at least a first battery pack of the plurality of battery packs is electrically isolated from at least a second battery pack of the plurality of battery packs; determining control commands for the plurality of actuators based on the desired force and moment commands by solving an optimization problem that comprises an energy balance term for balancing energy draw of the electric propulsion units according to the monitored energy state of the plurality of battery packs; and controlling the plurality of actuators according to the determined control commands to meet the desired force and moment commands of the electric aircraft.

In any of these embodiments, the first battery pack may have a lower remaining energy than the second battery pack, and a first electric propulsion unit powered by the first battery pack may operate at a lower power than a second electric propulsion unit powered by the second battery pack.

In any of these embodiments, the first battery pack and the second battery pack may have the same energy capacity.

In any of these embodiments, the first electric propulsion unit and the second electric propulsion unit may have the same power rating.

In any of these embodiments, the energy balance term may include a set of preferred operating states for the plurality of electric propulsion units, and preferred operating states for electric propulsion units powered by battery packs having lower remaining energy may be lower than preferred operating states for electric propulsion units powered by battery packs having higher remaining energy.

In any of these embodiments, the energy balance term may include a set of penalties for deviating from preferred operating states and a penalty associated with an electric propulsion unit connected to a lower energy battery pack may be higher than a penalty associated with an electric propulsion unit connected to a higher energy battery pack.

In any of these embodiments, the optimization problem may include a noise minimization term for minimizing noise generated by the electric propulsion units.

In any of these embodiments, the electric aircraft may be a vertical take-off and landing aircraft.

In any of these embodiments, the electric aircraft may be manned.

In any of these embodiments, the electric aircraft may include multiple electric propulsion units on either side of a fuselage of the aircraft.

According to various embodiments, a system for controlling an electric aircraft that includes a plurality of actuators that includes a plurality of electric propulsion units, includes one or more processors, memory, and one or more programs stored in the memory for execution by the one or more processors for: receiving desired force and moment commands for the electric aircraft; monitoring energy states of the plurality of battery packs, wherein at least a first battery pack of the plurality of battery packs is electrically isolated from at least a second battery pack of the plurality of battery packs; determining control commands for the plurality of actuators based on the desired force and moment commands by solving an optimization problem that comprises an energy balance term for balancing energy draw of the electric propulsion units according to the monitored energy state of the plurality of battery packs; and controlling the plurality of actuators according to the determined control commands to meet the desired force and moment commands of the electric aircraft.

BRIEF DESCRIPTION OF THE DRAWINGS

The invention will now be described, by way of example only, with reference to the accompanying drawings, in which.

DETAILED DESCRIPTION

According to various embodiments, systems and methods for electric VTOL aircraft control allocation include accounting for rotor acoustics and/or battery pack energy balance in distributing control effort among the actuators of the aircraft. According to various embodiments, control allocation includes solving an optimization objective function that includes achieving force and moment commands as a primary objective and modulating rotor acoustics and/or balancing battery pack energy as secondary objectives.

According to various embodiments, an electric VTOL aircraft includes a plurality of electric propulsion units on each side of the fuselage of the aircraft. The electric propulsion units include rotor driven propellers and the acoustic noise generated by the aircraft can be decreased by operating the rotors at different speeds to spread the combined frequencies across a larger frequency band, which can reduce the amplitude of any single frequency, resulting in lower perceived noise. In some embodiments, rotor acoustics can be modulated by minimizing propeller tip speed while still providing the required thrust. This can be done by determining the rotor speed and propeller pitch that achieves the lowest tip speed for a required thrust. In some embodiments, at least a portion of the electric propulsion units are tiltable and rotor acoustics can be modulated by utilizing thrust vectoring and flight trajectories to minimize edgewise flight time. In some embodiments rotor acoustics can be modulated by balancing thrust distribution to minimize excessive demand on any one rotor.

According to various embodiments, the electric VTOL aircraft includes a plurality of battery packs that are electrically isolated from one another to provide power to different portions of the plurality of electric propulsion units. In some embodiments, control allocation includes battery pack energy balancing, which can be achieved by minimizing usage of electric propulsion units that are connected to battery packs that have lower charge relative to other battery packs. According to various embodiments, minimizing usage of electric propulsion units connected to lower charge battery packs can be achieved by reducing the preferred states of the electric propulsion units in the control allocation optimization object function and/or increasing the penalty for deviations from preferred states.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well, unless the context clearly indicates otherwise. It is also to be understood that the term "and/or", as used herein, refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

As used herein, the term "proprotor" refers to a variable pitch propeller that can provide thrust for vertical lift and for forward propulsion by varying the pitch of the propeller.

As used herein, the term "battery pack" means any combination of electrically connected batteries (i.e., battery cells) and can include a plurality of batteries arranged in series, parallel, or a combination of series and parallel.

Figure 1A:
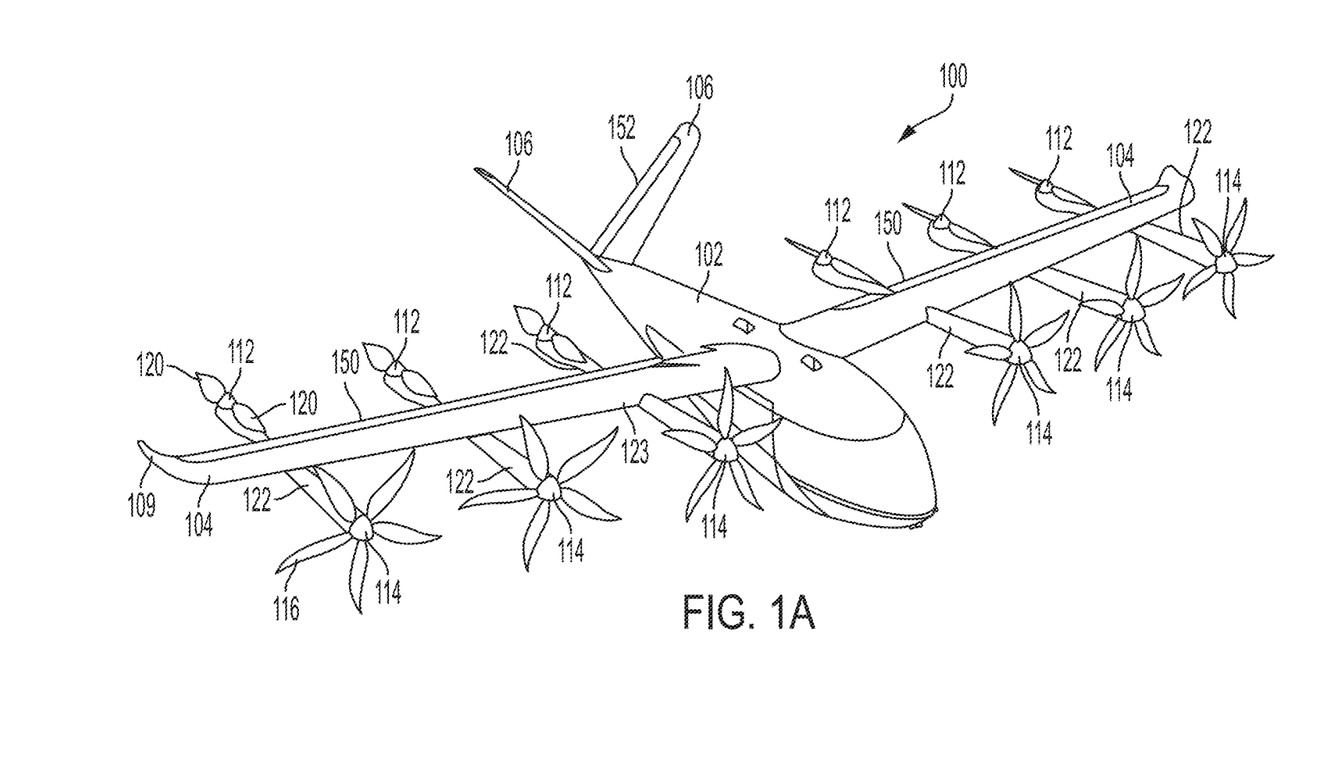
FIG. 1A shows a VTOL aircraft in a forward flight configuration, according to various embodiments.
Figure 1B:
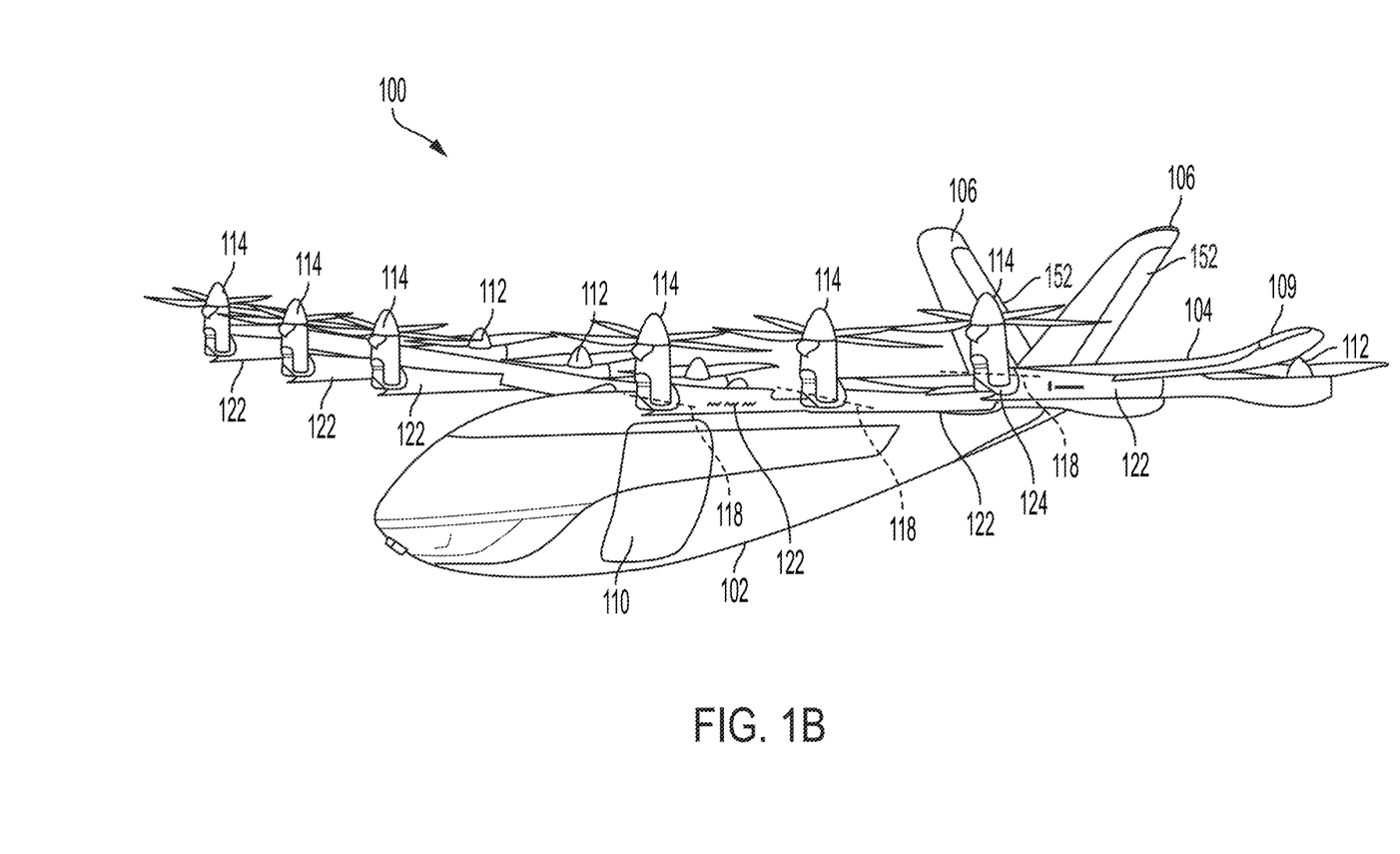
FIG. 1B shows a VTOL aircraft in a takeoff and landing configuration, according to various embodiments.

FIGS. 1A and 1B illustrate a VTOL aircraft 100 in a cruise configuration and a vertical take-off and landing configuration, respectively, according to various embodiments. Exemplary embodiments of a VTOL aircraft according to various embodiments are discussed in U.S. patent application Ser. No. 16/878,380, titled "Vertical Take-Off and Landing Aircraft" and filed May 19, 2020, the entire contents of which are incorporated herein by reference.

The aircraft 100 includes a fuselage 102, wings 104 mounted to the fuselage 102, and one or more rear stabilizers 106 mounted to the rear of the fuselage 102. The aircraft 100 includes a plurality rotors 112 and a plurality of proprotors 114 (collectively referred to herein as EPUs). The EPUs (112, 114) generally include an electric motor driving a plurality of blades and a motor controller for controlling/powering the motor. In some embodiments, the pitch of the blades of one or more of the EPUs can be controlled in-flight. In some embodiments, an EPU can include a plurality of partial motors that can independently and together drive the fan and can be controlled by a plurality of separate motor controllers.

Rotors 112 are mounted to the wings 104 and are configured to provide lift for vertical take-off and landing. Proprotors 114 are mounted to the wings 104 and are tiltable between lift configurations in which they provide a portion of the lift required for vertical take-off and landing and hovering, as shown in FIG. 1B, and propulsion configurations in which they provide forward thrust to the aircraft 100 for horizontal flight, as shown in FIG. 1A. As used herein, a proprotor lift configuration refers to any proprotor orientation in which the proprotor thrust is providing primarily lift to the aircraft and a proprotor propulsion configuration refers to any proprotor orientation in which the proprotor thrust is providing primarily forward thrust to the aircraft.

According to various embodiments, the rotors 112 are configured for providing lift only, with all propulsion being provided by the proprotors. Accordingly, the rotors 112 may be in fixed positions. During take-off and landing, the proprotors 114 are tilted to lift configurations in which their thrust is directed downwardly for providing additional lift. In some embodiments, the rotors 112 are tiltable for thrust vectoring.

For forward flight, the proprotors 114 tilt from their lift configurations to their propulsion configurations. In other words, the tilt of the proprotors 114 is varied from a range of tilt positions in which the proprotor thrust is directed upward to provide lift during vertical take-off and landing and during hover to a range of tilt positions in which the proprotor thrust is directed forward to provide forward thrust to the aircraft 100. The proprotors tilt about axes 118 that are perpendicular to the forward direction of the aircraft 100. When the aircraft 100 is in full forward flight, lift may be provided entirely by the wings 104, and the rotors 112 may be shut-off. The blades 120 of the rotors 112 may be locked in a low drag position for aircraft cruising. In some embodiments, the rotors 112 each have two blades 120 that are locked for cruising in minimum drag positions in which one blade is directly in front of the other blade as illustrated in FIG. 1A. In some embodiments, the rotors 112 have more than two blades. In some embodiments, the proprotors 114 include more blades 116 than the rotors 112. For example, as illustrated in FIGS. 1A and 1B, the rotors 112 may each include two blades and the proprotors 114 may each include five blades. According to various embodiments, the proprotors 114 can have from 2 to 5 blades.

According to various embodiments, the aircraft includes only one wing 104 on each side of the fuselage 102 (or a single wing that extends across the entire aircraft) and at least a portion of the rotors 112 are located rearward of the wings 104 and at least a portion of the proprotors 114 are located forward of the wings 104. In some embodiments, all of the rotors 112 are located rearward of the wings 104 and all of the proprotors are located forward of the wings 104. According to some embodiments, all rotors 112 and proprotors 114 are mounted to the wings—i.e., no rotors or proprotors are mounted to the fuselage. According to various embodiments, the rotors 112 are all located rearward of the wings 104 and the proprotors 114 are all located forward of the wings 104. According to some embodiments, all rotors 112 and proprotors 114 are positioned inward of the wing tips 109.

According to various embodiments, the rotors 112 and proprotors 114 are mounted to the wings 104 by booms 122. The booms 122 may be mounted beneath the wings 104, on top of the wings, and/or may be integrated into the wing profile. According to various embodiments, one rotor 112 and one proprotor 114 are mounted to each boom 122. The rotor 112 may be mounted at a rear end of the boom 122 and a proprotor 114 may be mounted at a front end of the boom 122. In some embodiments, the rotor 112 is mounted in a fixed position on the boom 122. In some embodiments, the proprotor 114 is mounted to a front end of the boom 122 via a hinge 124. The proprotor 114 may be mounted to the boom 122 such that the proprotor 114 is aligned with the body of the boom 122 when in its propulsion configuration, forming a continuous extension of the front end of the boom 122 that minimizes drag for forward flight.

According to various embodiments, the aircraft 100 may include multiple wings on each side of the aircraft 100, only one wing on each side of the aircraft 100, or a single wing that extends across the aircraft 100. According to some embodiments, at least one wing 104 is a high wing mounted to an upper side of the fuselage 102. According to some embodiments, the wings include control surfaces 150, such as flaps and/or ailerons, which are positioned via one or more control surface actuators (not shown). According to some embodiments, the wings can have curved wing tips 109 for reduced drag during forward flight. According to some embodiments, the rear stabilizers 106 include control surfaces 152, such as one or more rudders, one or more elevators, and/or one or more combined rudder-elevators that are positioned via one or more control surface actuators (not shown). The wing(s) may have any suitable design. In some embodiments, the wings have a tapering leading edge 123, as shown for example, in the embodiment of FIG. 1A. In some embodiments, the wings have a tapering trailing edge.

Figure 2A:
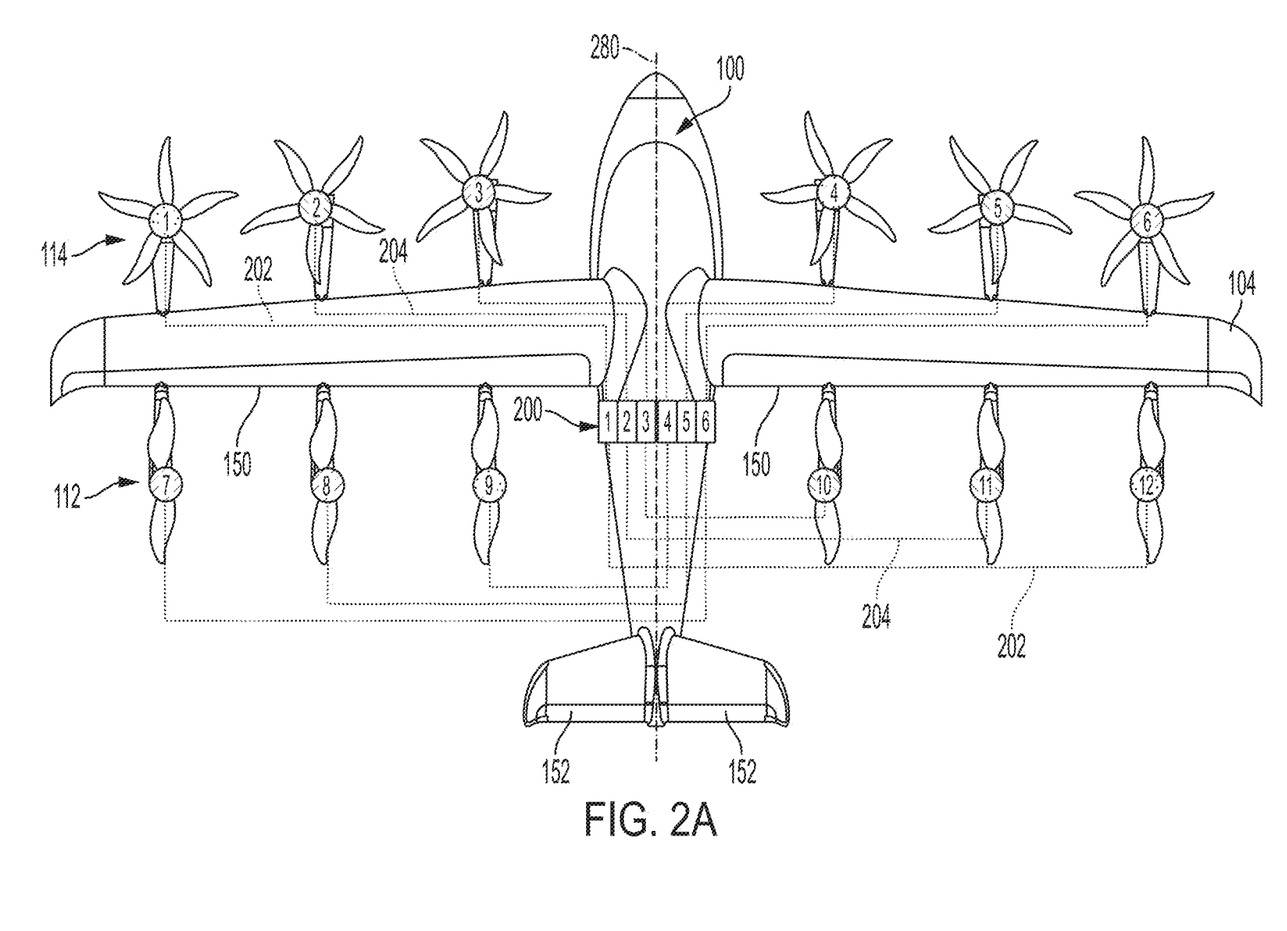
FIGS. 2A and 2B illustrate a power distribution architecture for powering the electric propulsion units of an aircraft, according to various embodiments.
Figure 2B:
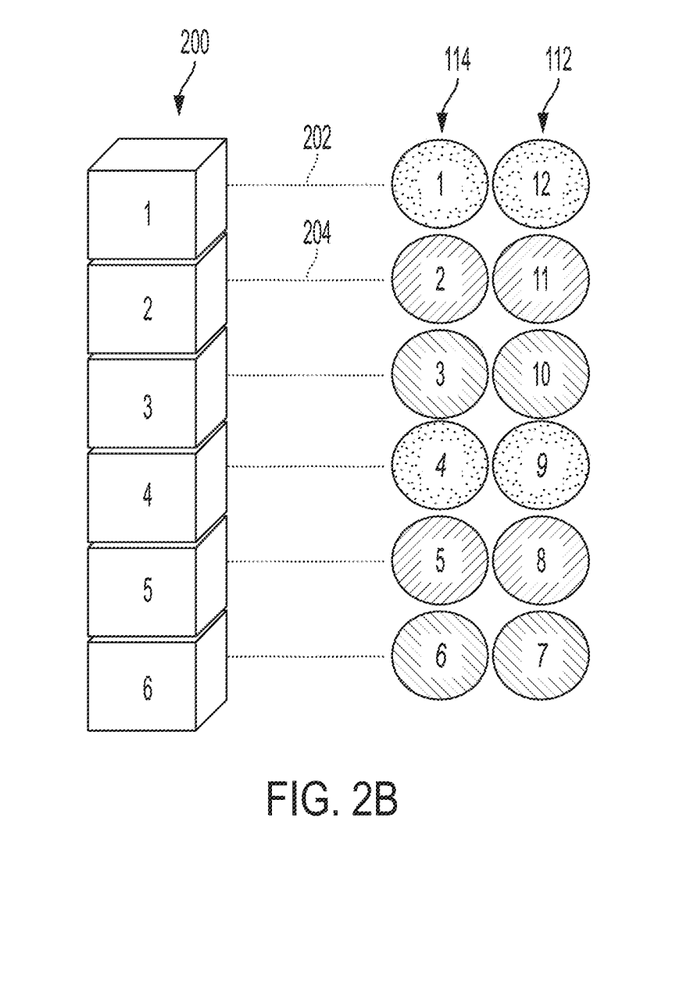

FIG. 2A illustrates a power distribution architecture for powering the EPUs (112, 114) of aircraft 100, according to various embodiments. Although FIGS. 1A-2A illustrates 12 EPUs (numbered 1-12 in FIG. 2A) mounted to wings 104 aircraft according to various embodiments can have any suitable number of EPUs, including four, six, eight, ten, fourteen, eighteen, twenty, or more. The EPUs are powered by a plurality of battery packs 200. In the embodiment illustrated in FIG. 2A, there are six battery packs 200—numbered 1 through 6. Each battery pack 200 powers only a portion of the EPUs. In the illustrated embodiment, each battery pack 200 powers two EPUs. The groupings of battery packs and EPUs according to the embodiment illustrated in FIG. 2A is listed in FIG. 2B. Battery pack 1 powers EPUs 1 and 12, battery pack 2 powers EPUs 2 and 11, and so on. Each battery pack 200 is connected to its respective portion of the EPUs via a dedicated power distribution bus—e.g., buses 202, 204. So, the power distribution bus 202 of one battery pack 1 is not electrically connected to the power distribution bus 204 of battery pack 2.

Since the battery pack 200 are electrically isolated from one another, an electrical failure in one battery pack or its power distribution does not affect the operation of the other EPUs and battery packs. Only the EPUs powered by the failed battery pack or power distribution are affected. Thus, there is no single point of failure in the powering of the aircraft. Further, since the battery packs and power distribution circuitry are isolated from one another, there is no need for diodes to prevent current from flowing from one battery pack to another. This can result in significant weight savings and increased efficiency relative to systems that have battery packs in parallel.

According to various embodiments, the particular EPUs that are powered by a given battery pack may be selected to reduce the destabilization effects caused by a loss of power to the EPUs should the battery pack fail. According to various embodiments, EPUs that are arranged on opposite sides of one or more axes of symmetry of the collection of EPUs can be powered by the same battery pack to reduce the roll, pitch, or yaw moments that may be caused by the loss of power to the EPUs driven by the battery pack. For example, EPUs in the same relative position on either side of the longitudinal axis 280 of the aircraft may be driven by a first battery pack so that, should one of the battery packs fail, minimal roll moments will occur because the thrust provided by the remaining EPUs will remain uniform about the longitudinal axis. Similarly, in some embodiments, a set of EPUs are arranged at least partially forward of the leading edge of a pair of wings and a set if EPUs are arranged at least partially rearward of the trailing edge of the pair of wings, and EPUs on opposite sides of the wings and opposite sides of the longitudinal axis 280 may be powered by the same battery pack so that minimal roll and pitch moments will occur in the event the battery pack fails (such as shown in FIG. 2A).

According to various embodiments, each battery pack 200 powers at least a portion of at least one proprotor 114 and at least a portion of at least one rotor 112. In the embodiment of FIG. 2A, rotors and proprotors at opposite positions are driven by the same battery pack 200. So, the outboard-most proprotor 114 on the left side of the fuselage 102 of the aircraft (EPU 1 in FIG. 2A) is powered by the same battery pack (battery pack 1 in FIG. 2A) as the outboard-most rotor 112 on the right side of the fuselage 102 (EPU 12). Similarly, the other pair of outboard-most EPUs (EPU 6 and EPU 7 in FIG. 2A) are powered by the same battery pack (battery pack 6). Groupings need not be limited to EPUs at exact opposite positions. For example, EPU 1 may be grouped with EPU 11 instead of EPU 12.

The number of EPUs powered by a given battery pack can be greater than two. For example, in some embodiments, the number of EPUs per battery pack can be three, four, five, six, or any other suitable portion of total number of EPUs. According to various embodiments, there can be different numbers of EPUs within each group. For example, one group can have two EPUs (two EPUs driven by a battery pack) while another group can have four EPUs (four EPUs driven by a different battery pack). The number of battery packs can be as few as two. In various embodiments, the number of battery packs is at least three, at least four, at least five, at least six, at least seven, at least eight, or higher.

Figure 3:
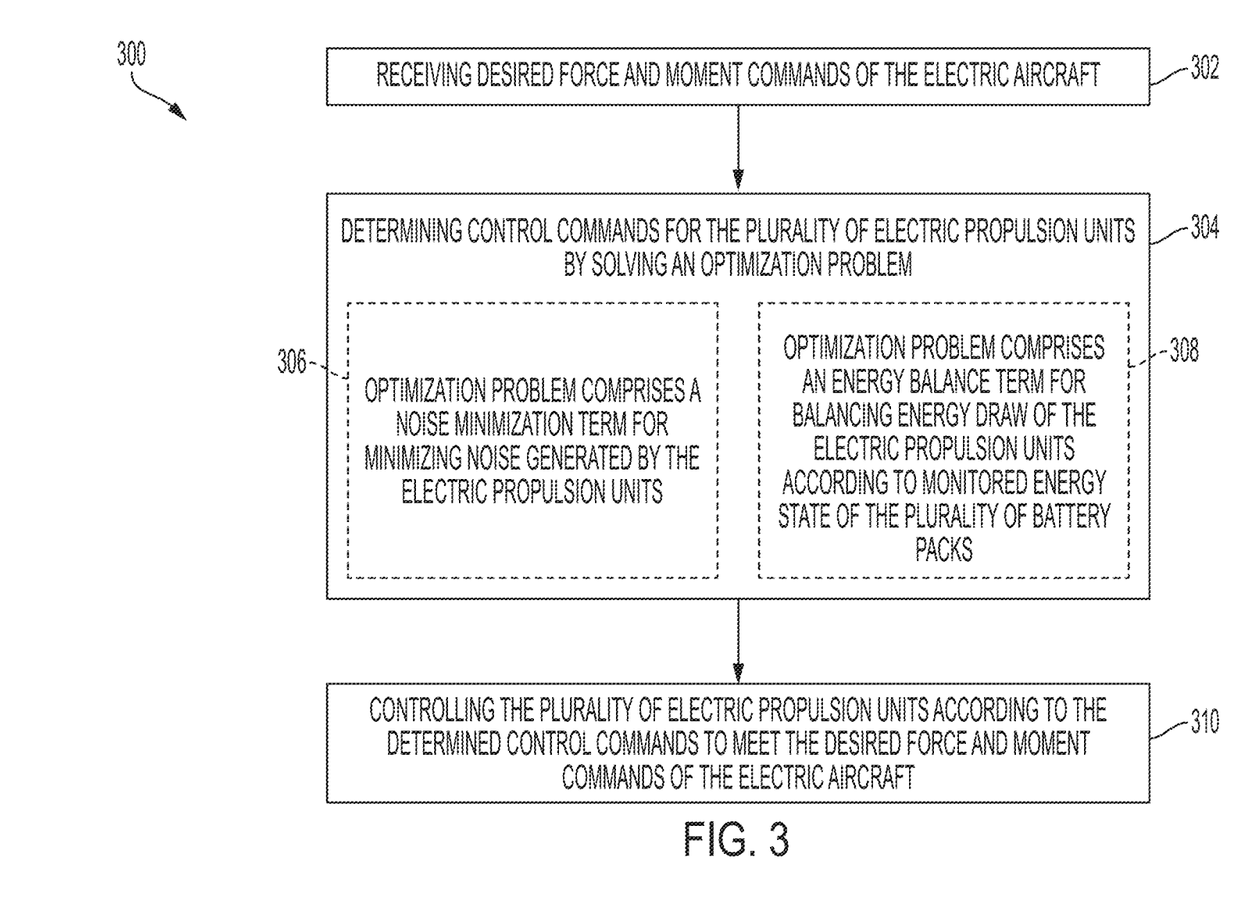
FIG. 3 is a block diagram of a method for control allocation for an electric aircraft, according to some embodiments.

FIG. 3 is a block diagram of a method 300 for control allocation for an electric aircraft, according to some embodiments. Method 300 can be used for control allocation for an electric aircraft, such as aircraft 100 of FIG. 1A. Method 300 determines commands for a plurality of actuators for the aircraft. The plurality of actuators can include one or more actuators associated with each of a plurality of electric propulsion units of the aircraft and can include one or more control surface actuators of the aircraft. As discussed further below, method 300 can include control allocation that takes advantage of the over-actuation of the aircraft to optimize for rotor acoustic noise and/or battery pack energy balance. According to some embodiments, method 300 utilizes the extra degrees of freedom available due to the number and configuration of electric propulsion units to reduce acoustic noise while meeting the desired forces and moments for the aircraft. According to some embodiments, the aircraft includes a plurality of battery packs that independently power electric propulsion units, and method 300 utilizes the extra degrees of freedom to balance battery pack energy.

At step 302, force and moment commands for the electric aircraft are received, which may include receiving the force and moment commands from an upstream computing module of the aircraft, such as a flight control system, that may generate force and moment commands from pilot input. The force and moment commands may be the desired forces and moments to be applied to the aircraft through action of one or more of the various actuators of the aircraft.

As used herein, an "actuator" is any subsystem of the aircraft that provides a degree of freedom to control the aircraft. For example, the rotor of each EPU is an actuator, with its degree of freedom being the rotational speed of the blades. One or more EPUs can include other actuators, such as a rotor tilting system that provides thrust vectoring and/or a propeller blade pitch system for adjusting the pitch of propeller blades. Thus, for example, aircraft 100 of FIGS. 1A and 1B can include up to three actuators per proprotor 114 (rotor speed, blade pitch, and rotor tilt) and up to two actuators per rotor 112 (rotor speed, blade pitch), which with the illustrated EPU configuration can provide up to 30 actuators for the EPUs (24 actuators for embodiments in which the rotor blade pitch is not adjustable). Other actuators can include control surface actuators on the wing(s), such as control surfaces 150 of FIG. 1A, and/or tail of the aircraft, such as control surfaces 152 of FIGS. 1A and 1B.

In some embodiments, there are 10 control surface actuators and the total number of actuators available for control allocation according to method 300 is 34.

At step 304, control commands for at least a portion the actuators of the aircraft are determined by solving an optimization problem that includes minimizing a cost function that seeks to meet the force and moment commands from step 302 as well as achieve one or more secondary objectives that can include reducing acoustic generated by the EPUs of the aircraft and/or balancing energy usage of a plurality of battery packs powering the electric propulsion units. The control commands include control commands for the actuators of the EPUs of the aircraft, which can include, for example, the rotor speed, propeller blade pitch, and/or rotor tilt (e.g., for proprotors).

According to some embodiments, the one or more secondary objectives includes modulating noise generated by the electric propulsion units of the aircraft, as indicated by optional block 306 in FIG. 3. According to various embodiments, reduced noise can be achieved by reducing the tip speed of propellers of one or more EPUs. According to some embodiments, the tip speed of a propeller of an EPU can be reduced while providing the required thrust by adjusting the propeller pitch. In some embodiments, reduced noise can be achieved by distributing loads across the EPUs to reduce load peaks at any one EPU.

In some embodiments, reduced noise can be achieved by operating EPUs at different speeds such that the acoustic frequencies generated by the EPUs are spread across a wider frequency band, which may be perceived by the human ear as less noisy. In some embodiments, EPUs closer to the fuselage are operated at lower speeds than EPU further from the fuselage to reduce the amount of noise generated nearer to the fuselage and its passengers. In some embodiments, the spreading of frequencies is mirrored across the aircraft centerline such that EPUs in the same position on either side of the aircraft are operated at the same speed to maintain a thrust balance, such as during straight-ahead flight. For example, the two inboard-most proprotors 114 on either side of the aircraft 100 of example in FIG. 1A may operate at the lowest speed of all the proprotors, while the two outboard-most proprotors 114 on either side of the aircraft 100 may operate at the highest speed of all of the proprotors while maintaining a balanced thrust about the yaw axis.

In some embodiments, at least a portion of the EPUs are tiltable and rotor noise acoustics can be modulated by utilizing thrust vectoring to minimize edgewise flight time. The cost function in step 304 can assign a relatively high cost to operating one or more of the tiltable EPUs at their purely vertical thrust positions, such that when the force and moments commands allow for it, the minimization of the cost function will tend to move the tiltable EPUs away from their purely vertical thrust positions more quickly than strictly required to meet the force and moment commands. According to some embodiments, thrust vectoring used to reduce acoustic noise can be countered by attitude adjustment via control surface actuation.

According to some embodiments, the one or more secondary objectives includes balancing energy draw of the electric propulsion units based on the energy state of a plurality of battery packs of the aircraft, as indicated by optional block 308 of method 300. In some embodiments, the aircraft includes a plurality of battery packs that independently power different EPUs and may be electrically isolated from one another. The energy states of the battery packs may be monitored and the EPUs controlled such that EPUs powered by lower energy battery packs may be utilized less than EPUs powered by higher energy battery packs via the control allocation of step 304. For example, with respect to the embodiment illustrated in FIGS. 2A and 2B, battery pack 1 may have relatively less charge than battery pack 2 at some point during flight and, to balance the energy of the battery packs, according to various embodiments, one or more of the EPUs powered by battery pack 1 may be operated at a relatively lower power state and one or more EPUs connected to battery pack 2 may be operated at a relatively higher power state to make up at least a portion of the lost thrust from the one or more EPUs connected to battery pack 1.

In some embodiments, relatively less charge can mean altogether less charge, such as where the battery packs have the same energy capacity and one has less remaining charge than the other. In some embodiments, relatively less charge can be relative to the capacity of the respective battery pack. For example, battery pack 2 of FIGS. 2A and 2B can be lower capacity than battery pack 1 but can have a higher relative charge than battery pack 1 (e.g., 90% for battery pack 2 and 80% for battery pack 1).

In some embodiments, the one or more EPUs connected to a lower energy battery pack are operated at a lower power than the one or more EPUs connected to the higher energy battery pack. For example, referring to FIGS. 2A and 2B, at least one EPU connected to battery pack 1 and at least one EPU connected to battery pack 2 may have the same power rating and the EPU connected to battery pack 1 may be operated at a lower power than the EPU connected to battery pack 2. In some embodiments, the one or more EPUs connected to a lower energy battery pack are operated at a lower power relative to a nominal power for the given aircraft operational state, which may or may not be a lower power than the one or more EPUs connected to a higher energy battery pack, which are operated at a higher power relative to their nominal power given the aircraft operational state. For example, an EPU connected to a lower energy battery pack may have a higher rated power than an EPU connected to a higher energy battery pack, and the EPU connected to the lower energy battery pack may be operated at a relatively lower power that is still higher than the relatively higher power of the EPU connected to the higher energy battery pack.

At step 310 at least a portion of the actuators of the aircraft are operated according to the control commands determined at step 304 to meet the desired force and moment commands of the electric aircraft. For example, the various actuators associated with the plurality of electric propulsion units are operated according to the determined control commands. Depending on the secondary objectives sought in the optimization of step 304, which can include modulating EPU acoustic noise, battery pack energy balance, or both, step 310 can achieve not only the desired forces and moments on the aircraft but also relatively lower acoustic noise and/or a degree of energy balance of the battery packs of the aircraft.

Figure 4:
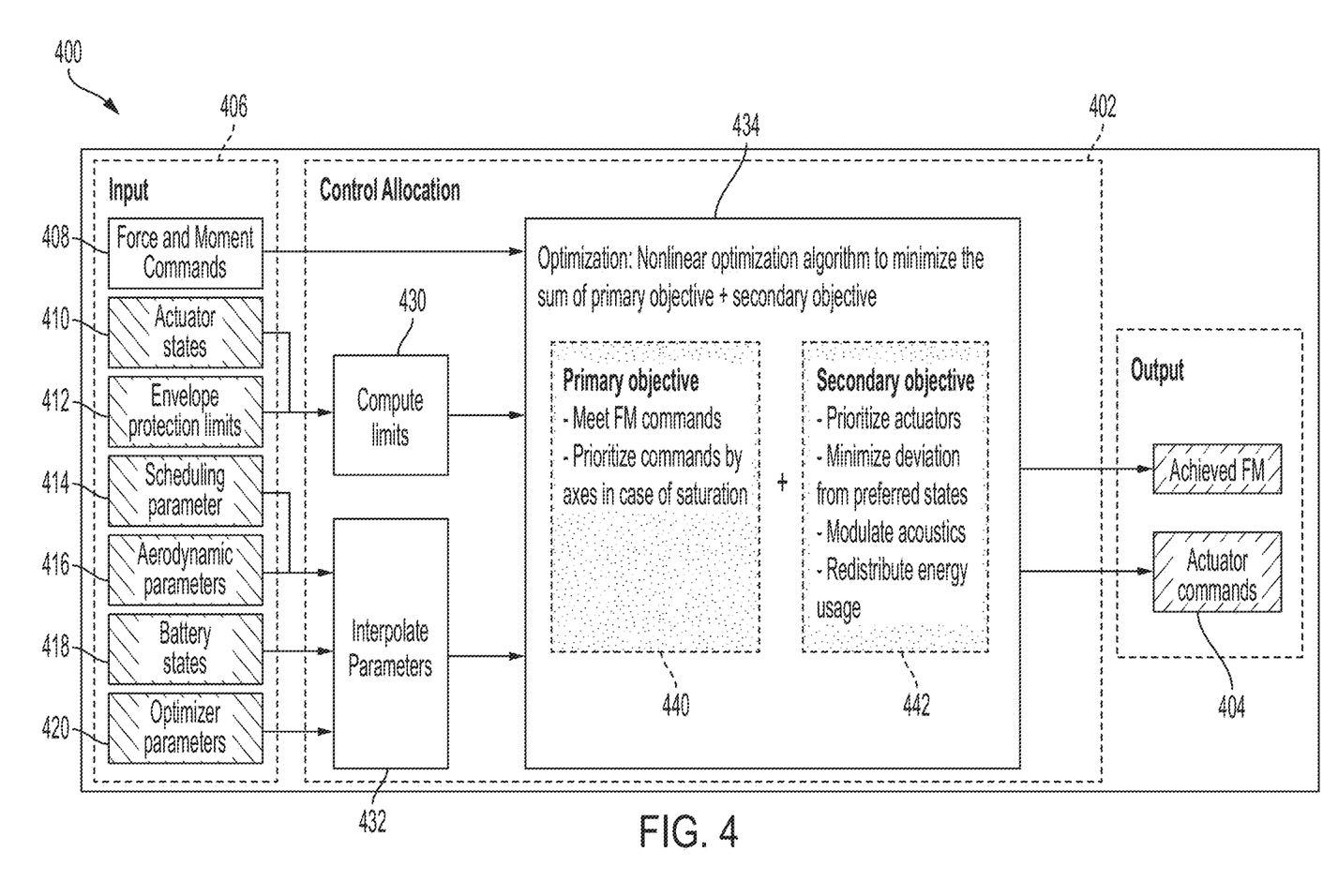
FIG. 4 is a functional block diagram of a control system for controlling actuators of an electric aircraft, according to various embodiments.

FIG. 4 is a functional block diagram of a control system 400 for controlling actuators of an electric VTOL aircraft, such as aircraft 100, according to various embodiments. System 400 includes a control allocation module 402 that generates actuator commands 404 based on various inputs 406. As discussed further below, control allocation module 402 determines actuator commands 404 by minimizing an objective function that includes one or more primary objectives, such as meeting commanded aircraft forces and moments, and one or more secondary objectives, which can include minimizing acoustic noise and/or optimizing battery pack usage. The control system 400 may be implemented by a microprocessor-based controller executing software code stored in a storage medium to implement the functions described herein. Control system 400 may also be implemented in hardware, or a combination of hardware and software. Control system 400 may be implemented as part of a flight control system of the aircraft. It is to be understood that many of conventional functions of the control system are not shown in FIG. 4 for ease of description.

The inputs 406 to the control allocation module 402 can include one or more of: force and moment commands 408, actuator states 410, envelope protection limits 412, scheduling parameter 414, aerodynamic parameters 416, battery states 418, and optimizer parameters 420. The force and moment commands 408 includes up to six force and moment commands, which can include x, y, and z force commands and x, y, and z moment commands. As is known in the art, the force and moment commands can be derived from operator commands (or autopilot commands, or commands from an autonomous controller for un-piloted aircraft) and the aircraft states (e.g., speed, acceleration, altitude, attitude). The force and moment commands 408 are generated by an upstream controller (not shown) and provided to the control allocation module 402.

The actuator states 410 include actuator hardware limits, such as travel limits, speed limits, response time limits, etc., and can include actuator health indicators that may indicate deteriorations in actuator performance that may limit a given actuator's ability to satisfy actuator commands. The actuator states 410 may be used to determine the bounds (e.g., minimum/maximum values) for individual actuator commands. The battery states 418 are the remaining energy of the battery packs of the aircraft, which may be monitored when the control allocation includes balancing battery pack energy states, according to various embodiments.

The envelope protection limits 412 can include command limits that prevent operation outside of the flight envelope, which defines the operational limits for the aircraft, including speed and acceleration-based limits, as is known in the art.

The scheduling parameter 414 is a speed-related parameter that is used for defining the allocation problem. The aerodynamic parameters 416 are parameters derived from aerodynamic and acoustic modeling and can be based on the actuator Jacobian matrices and actuator states. The aerodynamic parameters 416 may be functions of the scheduling parameter 414. The optimizer parameters 420 are parameters used to define the optimization problem, as discussed further below. The optimizer parameters 420 can include axis weights that define relative prioritization of force and moment axes. The optimizer parameters 420 can also include individual actuator weights that define the relative importance of different actuators in the control allocation problem. In some embodiments, the optimizer parameters 420 are functions of the scheduling parameter 414.

Control allocation module 402 can include a limit computing module 430, a parameter interpolation module 432, and an optimization module 434. The limit computing module 430 computes the limits of individual actuator commands based on the actuator states 410 and envelope protection limits 412. In normal operation, the minimum command limit for a given actuator includes the maximum of: the minimum hardware based limit and the minimum flight envelope limit; and the maximum command limit for a given actuator includes the minimum of: the maximum hardware based limit and the maximum flight envelope limit. In the case of an actuator failure, the command limits for the failed actuator correspond to the failure mode (e.g., the position of an unresponsive control surface actuator or 0 RPM for a failed rotor).

The parameter interpolation module 432 can be configured to determine parameters that vary with the scheduling parameter, which, as noted above, is based on the speed of the aircraft. The value of a given parameter (e.g., aerodynamic parameter or optimizer parameter) can be determined from a lookup table for the parameter based on the scheduling parameter associated with a current speed of the aircraft, as follows:

$$x_{out} = F(x_{table}, v)$$

where:

| $x_{out}$ | output of $x$ at condition $v$ |
| $x_{table}$ | look-up data for $x$ |
| $v$ | scheduling parameter |

In some embodiments, parameter interpolation module 432 can determine one or more parameters associated with one or more secondary objectives, such as battery pack energy balancing. For example, a parameter used for battery pack energy balancing can be determined from a lookup table for the parameter based on the battery states 418 and the scheduling parameter, such as follows:

$$x_{out} = F(x_{table}, v, E_{batt})$$

where:

| $x_{out}$ | output of $x$ at condition $v$ |
| $x_{table}$ | look-up data for $x$ |
| $v$ | scheduling parameter |
| $E_{batt}$ | remaining energy in a battery |

The optimization module 434 executes a nonlinear optimization algorithm that minimizes the sum of a primary objective 440 and a secondary objective 442. The primary objective 440 seeks to meet the force and moment commands 408 and may prioritize commands by axes in cases of saturation. The secondary objective 442 seeks to meet other operational goals in instances where the force and moment solution space include a plurality of actuator command combinations. The secondary objective 442 can include terms for modulating rotor acoustics and/or balancing energy usage, as discussed further below. Other operational goals that can be included in the secondary objective 442 can include prioritizing particular actuators and minimizing deviations from one or more preferred actuator states.

The optimization module 434 minimizes an objective function that includes the primary objective 440 and secondary objective 442. Below is an example of an objective function:

$$\|W(Bu-FM_{req})\|_2^2 + \|\text{null}(B)\varepsilon(u-u_0)\|_2^2 \quad \text{(Expression 1)}$$

According to various embodiments, the optimization module 434 finds a set of actuator commands u that minimizes the objective function of expression 1, subject to:

$$\min \leq u \leq \max$$

In expression 1, the first function, $\|W(Bu-FM_{req})\|_2^2$, corresponds to the primary objective 440. W includes weights for prioritizing particular force and moment axes and is determined by the interpolation module 432 based on the optimizer parameters 420. B is the actuator Jacobian matrix, which is determined by the interpolation module 432 based on the aerodynamic parameters. $FM_{req}$ is the force and moment commands.

The second function in expression 1, $\|null(B)\varepsilon(u-u_0)\|_2^2$, corresponds to the secondary objective 442 and includes the null space of the Jacobian matrix B. $\varepsilon$ includes weights for relative prioritization of actuators and is determined by the interpolation module 432 based on the optimizer parameters 420. $u_0$ includes the actuator preferred operating states and is determined by the interpolation module 432 based on the aerodynamic parameters 416.

The secondary objective function in expression 1 is an $l_2$ norm that minimizes the deviation from the actuator preferred operating states. Other minimization functions can be used, such as an $l_1$ norm to minimize control effort or an $l_\infty$ norm to minimize the maximum command.

According to various embodiments, energy balance for a plurality of electric propulsion units powered by electrically isolated battery packs is included in the secondary objective based on adjusting at least one of the weights $\varepsilon$ and the actuator preferred operating states $u_0$ based on the battery states 418. For example, a weight $\varepsilon$ for an actuator associated with a lower energy battery pack may have a higher value (a higher penalty for deviating from a preferred state) than a weight $\varepsilon$ for an actuator associated with a higher energy battery pack. Additionally or alternatively, a preferred operating state $u_0$ for an actuator associated with a lower energy battery pack may have a lower value than a preferred operating state $u_0$ for an actuator associated with a lower energy battery pack.

According to various embodiments, acoustic modulation of the plurality of electric propulsion units of the aircraft is included in the secondary objective by applying the preferred operating states u0 that minimize the acoustics received in the cabin. For example, at any given aircraft speed, the preferred operating speeds of rotors and/or proprotors are spread across a range of frequencies, so as to reduce the noise perceived by the passengers.

The optimization module 434 finds the set of actuator commands u that minimizes the objective function of expression 1, subject to the requirement that u is between the actuator command limits $u_{min}$ and $u_{max}$ as determined by the limit computing module 430.

According to various embodiments, the objective function can be solved by formulating the objective function as a quadratic problem and using a quadratic programming solver to solve the quadratic problem. Examples of suitable quadratic programming solvers include interior point, active set, conjugate gradient, and augmented Lagrangian solvers.

Figure 5:
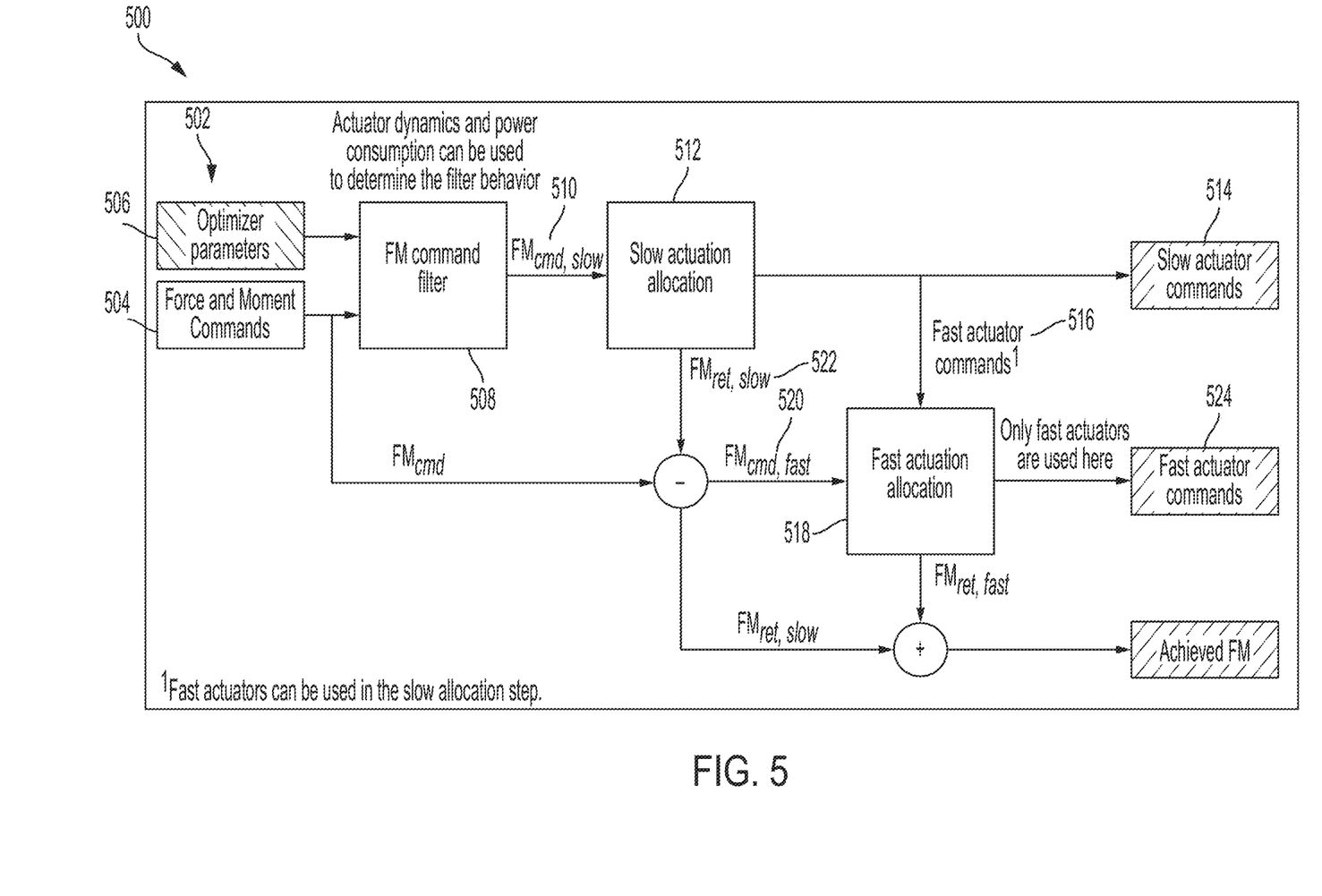
FIG. 5 is a functional block diagram of a system for control allocation that includes multi-step optimization with frequency partitioning, according to various embodiments.

FIG. 5 is a functional block diagram of a system 500 for control allocation that includes multi-step optimization with frequency partitioning, according to various embodiments. The control allocation of system 500 includes a first control allocation step performed based on low frequency force and moment commands and a second control allocation step performed based on high frequency force and moment commands. System 500 can ensure that high frequency commands are not generated for slow actuators that cannot respond to the high frequency commands. Similar to system 400 of FIG. 4, system 500 can provide control allocation that seeks to achieve one or more secondary objectives, such as reduced noise and/or battery pack energy balance, with lower computational cost relative to single-step optimization.

In system 500, a plurality of inputs 502 are provided to a force and comment commands filter 508. The plurality of inputs 502 includes force and moment commands 504 and can include optimizer parameters 506. Filter 508 filters low frequency force and moment commands 510 from the unfiltered force and moment commands 504. Filter 508 can filter low frequency force and moments commands based on a filter cutoff frequency and gain, which can be predetermined parameters that may be based on the scheduling parameter. Actuator dynamics and/or power consumption can be used to determine the filter behavior. For example, actuator response times may be used to determine the appropriate filter cutoff frequency such that relatively low frequency actuator commands are generated for relatively slow actuators—i.e., actuators that have relatively long response times. According to various embodiments, the group of slow actuators can include actuators for controlling tilt of an electric propulsion units and actuators for controlling blade pitch, whereas the group of fast actuators can include electric propulsion unit motors for controlling the blade speed, and one or more control surface actuators. According to various embodiments, actuator states, envelope protection limits, and/or the scheduling parameter may be fed directly to a slow actuation allocation module 512 to determine the limits of slow actuator commands 514. According to various embodiments, actuator states, envelope protection limits, and/or the scheduling parameter may be fed directly into a fast actuation allocation module 518 to determine the limits of fast actuator commands 524. Other inputs, such as interpolated aerodynamic parameters and/or battery states may also be fed directly into modules 512 and 518 to shape the objective functions solved in the respective modules.

The low frequency force and moment commands 510 are provided to a slow actuation allocation module 512, which can be configured in similar fashion to optimization module 434 of FIG. 4, that determines a set of actuator commands by minimizing an objective function, as discussed above with respect to control allocation module 402. A set of slow actuator commands 514 is output from the slow actuation allocation module 512 for controlling the slow actuators.

The slow actuation allocation module 512 may also output a set of fast actuator commands 516, which can be provided to a fast actuation allocation module 518. The fast actuation allocation module 518 is also provided with a set of high frequency force and moment commands 520. The high frequency force and moment commands 520 may be provided to the fast actuation allocation module 518 by subtracting from the force and moment commands 504 the forces and moments 522 that the slow actuation allocation module 512 has determined are achieved from the slow actuator commands 514 and fast actuator commands 516 determined by the slow actuation allocation module 512.

The fast actuation allocation module 518 determines a set of actuator commands by minimizing an objective function, as discussed above with respect to control allocation module 402, and in similar fashion to slow actuation allocation module 512. The fast actuation allocation module 518 outputs only fast actuator commands 524 for controlling the fast actuators. Thus, slow actuators are controlled based on the slow actuator commands 514 from the slow actuation allocation module 512 and fast actuators are controlled based on the fast actuator commands 524 from the fast actuation allocation module 518.

According to various embodiments, when force and moment commands 504 are higher frequency than what the slow actuators alone can handle, the slow actuation allocation module 512 shall output slow actuator commands 514 that may be close to but not exceeding the hardware limits of the slow actuators. The unfulfilled portion of the force and moment commands 504 can then be subsequently met by the fast actuators via fast actuation allocation module 518. While the multi-step optimization with frequency partitioning of system 500 may be computationally more intensive than a single step optimization control allocation, it allows concurrent utilization of both slow and fast actuators.

Figure 6:
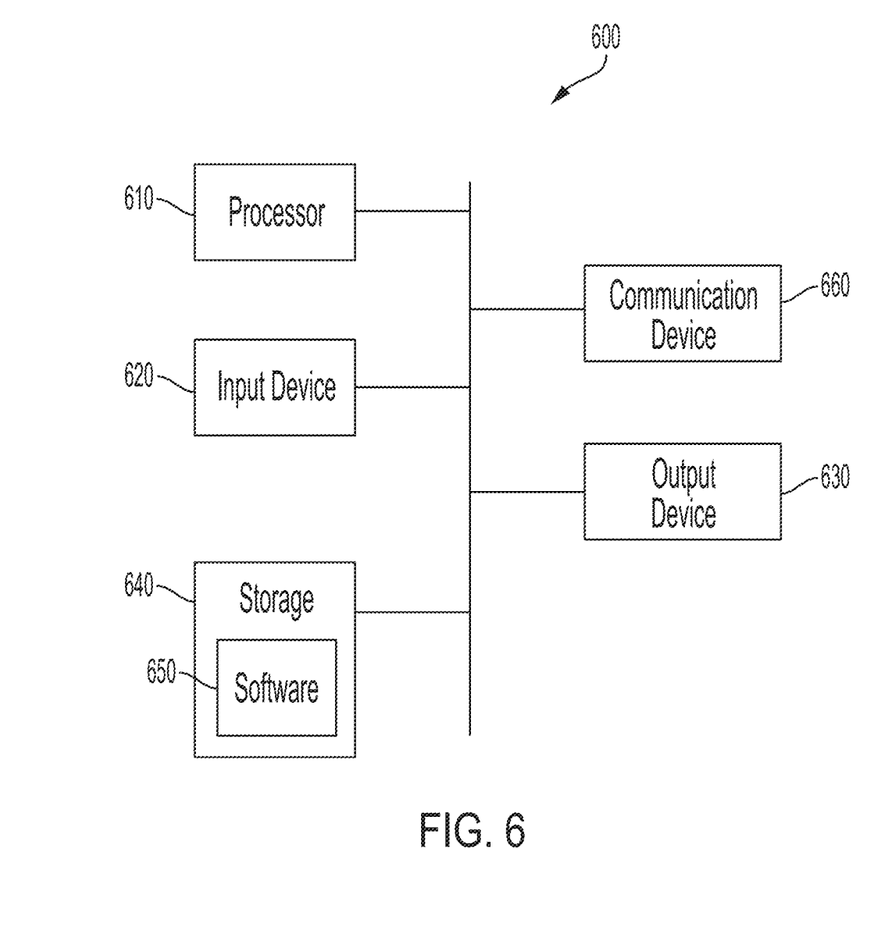
FIG. 6 illustrates an example of a computing system 700, according to various embodiments.

FIG. 6 illustrates an example of a computing system 600, in accordance with some embodiments, that can be used for one or more of components of system 400 of FIG. 1 and/or system 500 of FIG. 5, such as control allocation module 402 of system 400, slow actuation allocation module 512 of system 500, and/or fast actuation allocation module 518 of system 500. System 600 can be any suitable type of processor-based system. The system 600 can include, for example, one or more of input device 620, output device 630, one or more processors 610, storage 640, and communication device 660.

Input device 620 can be any suitable device that enables user input, such as user input from a pilot, such as one or more buttons, levers, and/or switches, one or more touchscreens, etc. Output device 630 can be or include any suitable device that provides output, such as a display, touch screen, haptics device, virtual/augmented reality display, or speaker.

Storage 640 can be any suitable device that provides storage, such as an electrical, magnetic, or optical memory including a RAM, cache, hard drive, removable storage disk, or other non-transitory computer readable medium. Communication device 660 can include any suitable device or combination of devices capable of transmitting and receiving signals from one or more other computing systems or modules. The components of the computing system 600 can be connected in any suitable manner, such as via a physical bus or wirelessly.

Processor(s) 610 can be any suitable processor or combination of processors, including any of, or any combination of, a central processing unit (CPU), graphics processing unit (GPU), field programmable gate array (FPGA), and application-specific integrated circuit (ASIC). Software 650, which can be stored in storage 640 and executed by one or more processors 610, can include, for example, the programming that embodies the functionality or portions of the functionality of the present disclosure (e.g., as embodied in the devices as described above). For example, software 650 can include one or more programs for execution by one or more processor(s) 610 for performing one or more of the steps of the methods described herein, such as one or more steps of method 300 of FIG. 3.

Software 650 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium. System 600 can implement any suitable operating system and can be written in any suitable programming language.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method of controlling an electric aircraft that comprises a plurality of actuators that includes a plurality of electric propulsion units and a plurality of battery packs that power the plurality of electric propulsion units, the method comprising:
   receiving desired force and moment commands for the electric aircraft;
   monitoring energy states of the plurality of battery packs, wherein at least a first battery pack of the plurality of battery packs is electrically isolated from at least a second battery pack of the plurality of battery packs;
   determining control commands for the plurality of actuators based on the desired force and moment commands by solving an optimization problem that comprises an energy balance term for balancing energy draw of the electric propulsion units according to the monitored energy state of the plurality of battery packs; and
   controlling the plurality of actuators according to the determined control commands to meet the desired force and moment commands of the electric aircraft.

2. The method of claim 1, wherein the first battery pack has a lower remaining energy than the second battery pack, and a first electric propulsion unit powered by the first battery pack operates at a lower power than a second electric propulsion unit powered by the second battery pack.

3. The method of claim 2, wherein the first battery pack and the second battery pack have the same energy capacity.

4. The method of claim 3, wherein the first electric propulsion unit and the second electric propulsion unit have the same power rating.

5. The method of claim 1, wherein the energy balance term comprises a set of preferred operating states for the plurality of electric propulsion units, and preferred operating states for electric propulsion units powered by battery packs having lower remaining energy are lower than preferred operating states for electric propulsion units powered by battery packs having higher remaining energy.

6. The method of claim 1, wherein the energy balance term comprises a set of penalties for deviating from preferred operating states and a penalty associated with an electric propulsion unit connected to a lower energy battery pack is higher than a penalty associated with an electric propulsion unit connected to a higher energy battery pack.

7. The method of claim 1, wherein the optimization problem comprises a noise minimization term for minimizing noise generated by the electric propulsion units.

8. The method of claim 1, wherein the electric aircraft is a vertical take-off and landing aircraft.

9. The method of claim 1, wherein the electric aircraft is manned.

10. The method of claim 1, wherein the electric aircraft comprises multiple electric propulsion units on either side of a fuselage of the aircraft.

11. The method of claim 1, wherein the optimization problem that is solved to determine control commands for the plurality of actuators comprises a noise minimization term for minimizing noise generated by the electric propulsion units.

12. A system for controlling an electric aircraft that comprises a plurality of actuators that includes a plurality of electric propulsion units, the system comprising one or more processors, memory, and one or more programs stored in the memory for execution by the one or more processors for:
  receiving desired force and moment commands for the electric aircraft;
  monitoring energy states of the plurality of battery packs, wherein at least a first battery pack of the plurality of battery packs is electrically isolated from at least a second battery pack of the plurality of battery packs;
  determining control commands for the plurality of actuators based on the desired force and moment commands by solving an optimization problem that comprises an energy balance term for balancing energy draw of the electric propulsion units according to the monitored energy state of the plurality of battery packs; and
  controlling the plurality of actuators according to the determined control commands to meet the desired force and moment commands of the electric aircraft.

* * * * *